(12) United States Patent
Massingill

(10) Patent No.: US 10,023,107 B1
(45) Date of Patent: Jul. 17, 2018

(54) TRAILER LIGHT SYSTEM

(71) Applicant: John W. Massingill, Hernando, FL (US)

(72) Inventor: John W. Massingill, Hernando, FL (US)

( * ) Notice: Subject to any disclaimer, the term of this patent is extended or adjusted under 35 U.S.C. 154(b) by 52 days.

(21) Appl. No.: 14/846,928

(22) Filed: Sep. 7, 2015

(51) Int. Cl.
*F21V 21/08* (2006.01)
*B60Q 1/26* (2006.01)
*B60Q 1/44* (2006.01)
*F21V 21/26* (2006.01)

(52) U.S. Cl.
CPC .............. *B60Q 1/2615* (2013.01); *B60Q 1/44* (2013.01); *F21V 21/26* (2013.01)

(58) Field of Classification Search
CPC .......... B60Q 1/2615; B60Q 1/44; B60Q 7/00; F21V 21/26; F21V 21/24; F21V 21/406; F21V 21/0925; F21V 21/0885; F21L 14/00
See application file for complete search history.

(56) References Cited

U.S. PATENT DOCUMENTS

| 5,548,496 A * | 8/1996 | Hart | F21V 21/06 362/370 |
|---|---|---|---|
| 5,769,526 A * | 6/1998 | Shaffer | B60Q 1/24 362/396 |
| 6,386,740 B1 * | 5/2002 | Grissom | B60Q 1/305 362/396 |
| 6,585,400 B2 * | 7/2003 | Leen | F21L 14/02 362/371 |
| 7,850,329 B2 * | 12/2010 | Henry | F21L 4/04 362/191 |

* cited by examiner

Primary Examiner — Peggy Neils

(57) ABSTRACT

An electric light has a light bulb within a housing. The housing has generally horizontal exterior and interior surfaces and a periphery. The exterior surface has a translucent plate. A gripper, constructed of a pair of similarly configured arms, supports the housing. Each arm has a downwardly extending finger and an upwardly extending handle. Each arm has a laterally extending projection with a pivot pin pivotably coupling arms. A spring encompasses the pivot pin and contacts the handles. A coupling assembly couples the housing to the gripper which is removably supported on a recipient surface of a trailing vehicle. The electric light is adjustably positioned with respect to the recipient surface of the trailing vehicle.

2 Claims, 3 Drawing Sheets

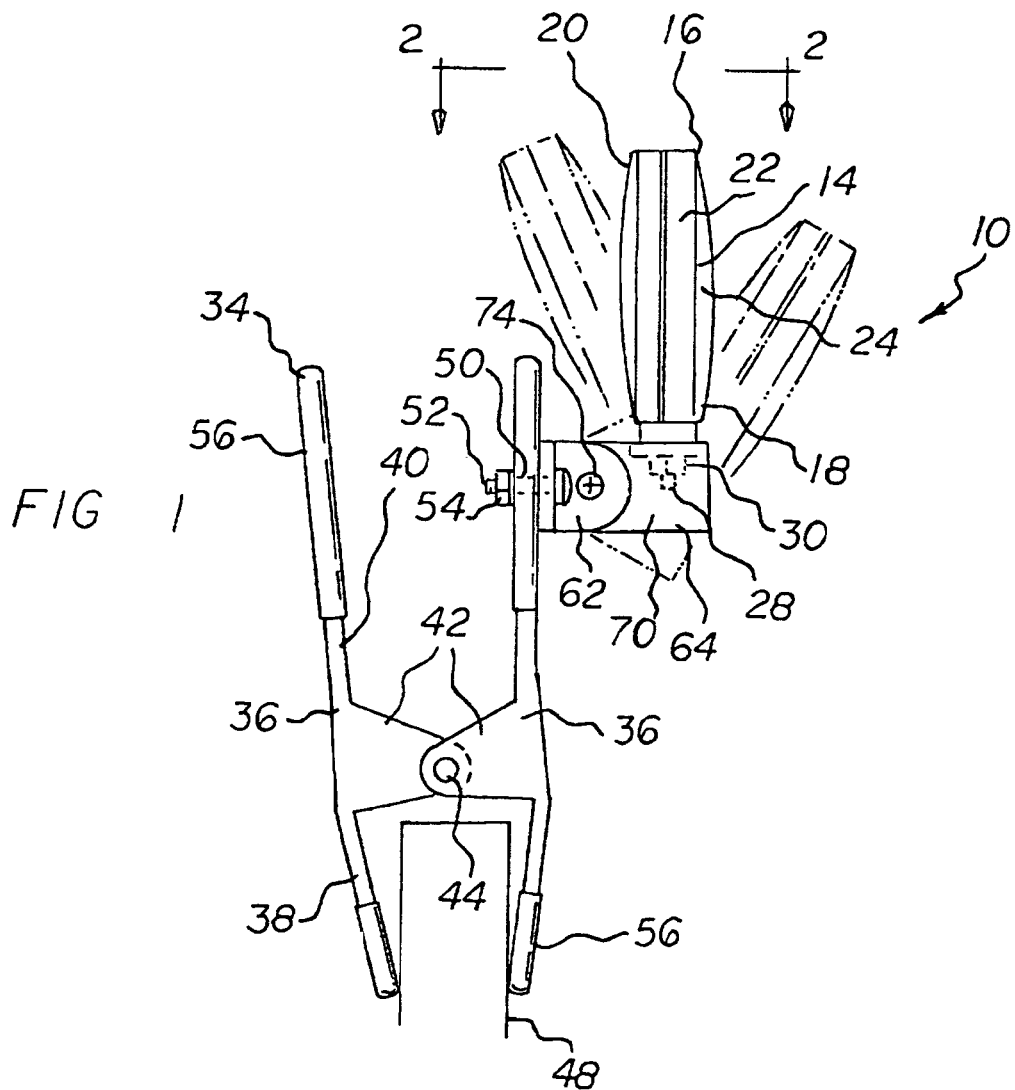
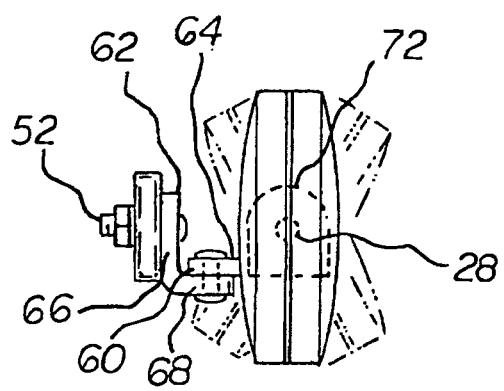

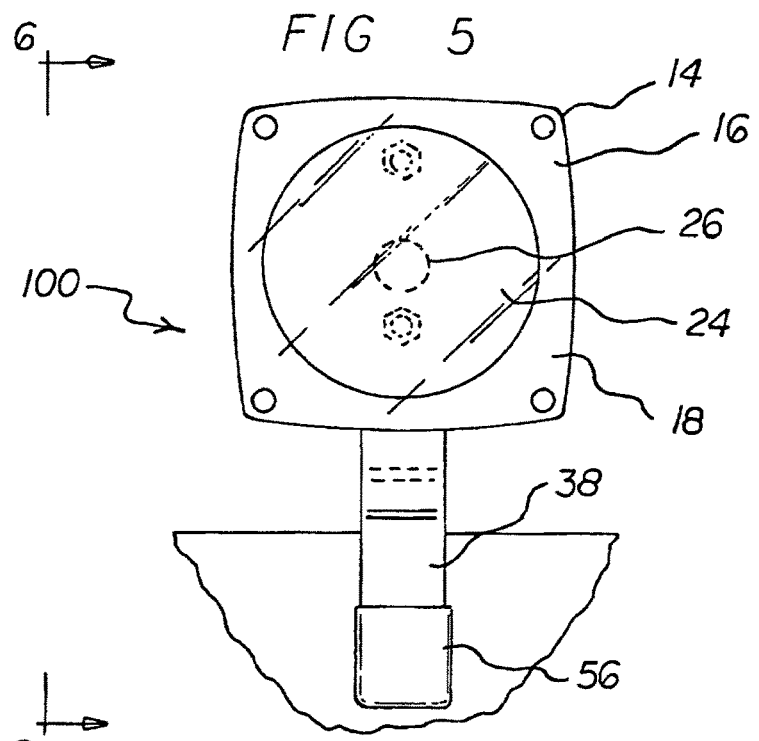
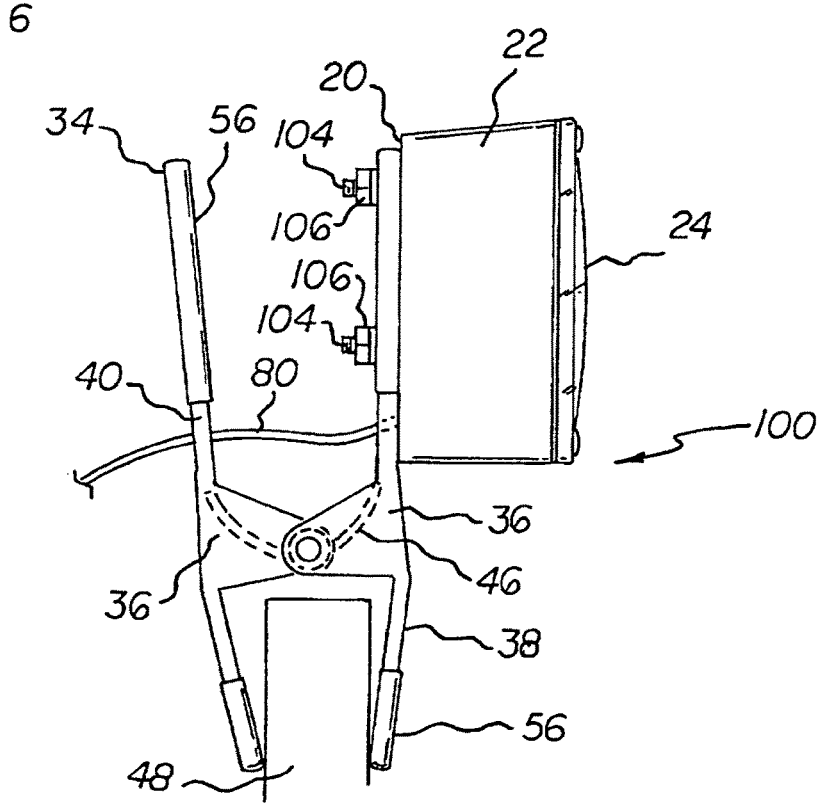

TRAILER LIGHT SYSTEM

BACKGROUND OF THE INVENTION

Field of the Invention

The present invention relates to a trailer light system and more particularly pertains to removably supporting and adjustably positioning a pair of similarly configured electric brake lights on a rear of a towed vehicle.

Description of the Prior Art

The use of trailer light systems of known designs and configurations is known in the prior art. More specifically, trailer light systems of known designs and configurations previously devised and utilized for the purpose of supporting and positioning trailer brake lights are known to consist basically of familiar, expected, and obvious structural configurations, notwithstanding the myriad of designs encompassed by the crowded prior art which has been developed for the fulfillment of countless objectives and requirements.

While the prior art devices fulfill their respective, particular objectives and requirements, they do not describe a trailer light system that allows for removably supporting and adjustably positioning a pair of similarly configured electric brake lights on a rear of a towed vehicle.

In this respect, the trailer light system according to the present invention substantially departs from the conventional concepts and designs of the prior art, and in doing so provides an apparatus primarily developed for the purpose of removably supporting and adjustably positioning a pair of similarly configured electric brake lights on a rear of a towed vehicle. Therefore, it can be appreciated that there exists a continuing need for a new and improved trailer light system which can be used for removably supporting and adjustably positioning a pair of similarly configured electric brake lights on a rear of a towed vehicle. In this regard, the present invention substantially fulfills this need.

SUMMARY OF THE INVENTION

In view of the foregoing disadvantages inherent in the known types of trailer light systems of known designs and configurations now present in the prior art, the present invention provides an improved trailer light system. As such, the general purpose of the present invention, which will be described subsequently in greater detail, is to provide a new and improved trailer light system and method which has all the advantages of the prior art and none of the disadvantages.

To attain this, the present invention essentially comprises a trailer light system for removably supporting and adjustably positioning a pair of similarly configured electric brake lights on a rear of a towed vehicle. The supporting and positioning is done in a safe, convenient, reliable and economical manner. First provided is a pair of similarly configured electric lights. Each of the electric lights has a generally rectilinear housing. Each housing has a generally horizontal exterior surface and a generally horizontal interior surface and a periphery between the exterior and interior surfaces. Each exterior surface has a circular red translucent plate constituting the central extent of the exterior surface. A light bulb is provided within each housing. A first bolt extends downwardly from the periphery. The first bolt has an associated nut.

Next provided is a pair of grippers. One of the grippers supports an associated housing. Each of the grippers is constructed of a pair of similarly configured arms. Each arm has a downwardly extending finger and an upwardly extending handle. Each arm has generally centrally located, laterally extending projections. A pivot pin pivotably couples the arms of each of the grippers. A spring encompasses each pivot pin and contacts the adjacent handles to urge the handles apart and to thereby urge the fingers together for releasable coupling to a recipient surface of a trailing vehicle. The recipient surface may be a transom of a towed boat as illustrated or a portion of a towed vehicle or the like. One of the handles of each of the grippers has a hole with a second bolt and an associated nut. Each of the arms is fabricated of a rigid material with an elastomeric sleeve over each of the fingers and handles. The preferred material for the arms is a composite plastic. Other rigid materials including other composites, plastics, and metallic materials could also be utilized.

A coupling assembly is next provided. The coupling assembly adjustably couples each of the housings to one of the associated handles. Each coupling assembly has a primary component and a secondary component. Each primary component has a first section positioned in contact with one of the associated handles and a second section extending forwardly at a right angle from the first section. The second bolt adjustably couples the first section to the handle. Each secondary component has a third section positioned in contact with one of the associated second sections. Each secondary component has a fourth section extending laterally at a right angle from the third section. The first bolt adjustably couples one of the associated housings to the fourth section. Each coupling assembly has a third bolt with an associated nut adjustably coupling the second and third sections. Each of the electric lights are adjustably coupled at spaced lateral locations to the recipient surface of the trailing vehicle. Each of the electric lights is individually adjustable in three orthogonal meridians by individual rotation about the first, second and third bolts. Each of the electric lights is also individually adjustable by repositioning the grippers with respect to the recipient surface.

Lastly, electric wires are provided. The electric wires have fixed ends attached to the electric lights and free ends adapted to be operatively coupled to a towing vehicle.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved trailer light system which has all of the advantages of the prior art trailer light systems of known designs and configurations and none of the disadvantages.

It is another object of the present invention to provide a new and improved trailer light system which may be easily and efficiently manufactured and marketed.

It is a further object of the present invention to provide a new and improved trailer light system which is of durable and reliable constructions.

An even further object of the present invention is to provide a new and improved trailer light system which is susceptible of a low cost of manufacture with regard to both materials and labor, and which accordingly is then susceptible of low prices of sale to the consuming public, thereby making such trailer light system economically available to the buying public.

Even still another object of the present invention is to provide a trailer light system for removably supporting and adjustably positioning a pair of similarly configured electric brake lights on a rear of a towed vehicle.

Lastly, it is an object of the present invention to provide a new and improved electric light having a light bulb within a housing. The housing has generally horizontal exterior and interior surfaces and a periphery. The exterior surface has a translucent plate. A gripper, constructed of a pair of similarly configured arms, supports the housing. Each arm has a downwardly extending finger and an upwardly extending handle. Each arm has a laterally extending projection with a pivot pin pivotably coupling arms. A spring encompasses the pivot pin and contacts the handles. A coupling assembly couples the housing to the gripper which is removably supported on a recipient surface of a trailing vehicle. The electric light is adjustably positioned with respect to the recipient surface of the trailing vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated both the preferred embodiment and an alternate embodiment of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a trailer light system constructed in accordance with the principles of the present invention.

FIG. 2 is a plan view of the system taken along line 2-2 of FIG. 1.

FIG. 5 is an enlarged rear elevational view taken at circle 5 of FIG. 3.

FIG. 6 is a side elevational view of the system taken along line 6-6 of FIG. 5.

The same reference numerals refer to the same parts throughout the various Figures.

DESCRIPTION OF THE PREFERRED EMBODIMENT

Figure 3:
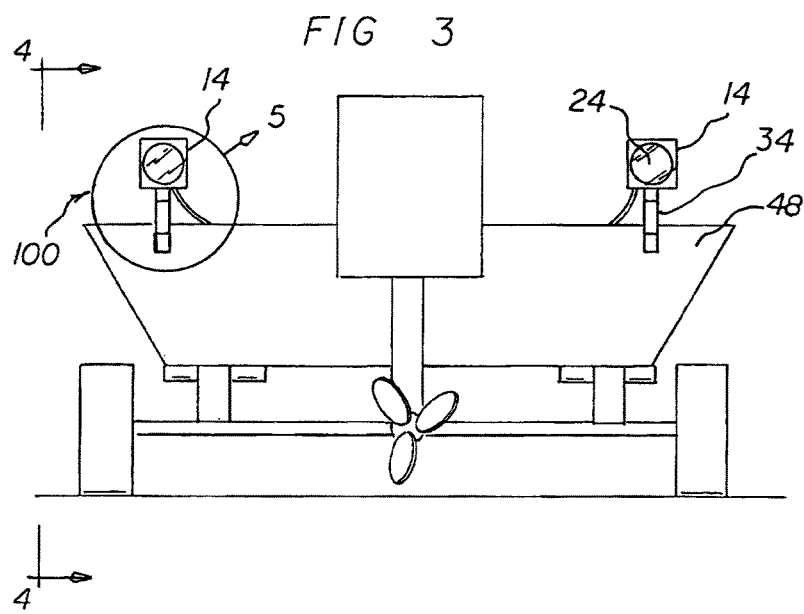
FIG. 3 is a rear view of the system but illustrating an alternate embodiment of the invention.

With reference now to the drawings, and in particular to FIG. 1 thereof, the preferred embodiment of the new and improved trailer light system embodying the principles and concepts of the present invention and generally designated by the reference numeral 10 will be described.

The present invention, the trailer light system 10 is comprised of a plurality of components. Such components in their broadest context include an electric light, a gripper supporting a housing, and a coupling assembly. Such components are individually configured and correlated with respect to each other so as to attain the desired objective.

The trailer light system 10 of the present invention is for removably supporting and adjustably positioning a pair of similarly configured electric brake lights on a rear of a towed vehicle. The supporting and positioning is done in a safe, convenient, reliable and economical manner. First provided is a pair of similarly configured electric lights 14. Each of the electric lights has a generally rectilinear housing 16. Each housing has a generally horizontal exterior surface 18 and a generally horizontal interior surface 20 and a periphery 22 between the exterior and interior surfaces. Each exterior surface has a circular red translucent plate 24 constituting the central extent of the exterior surface. A light bulb 26 is provided within each housing. A first bolt 28 extends downwardly from the periphery. The first bolt has an associated nut 30.

Next provided is a pair of grippers 34. One of the grippers supports an associated housing. Each of the grippers is constructed of a pair of similarly configured arms 36. Each arm has a downwardly extending finger 38 and an upwardly extending handle 40. Each arm has generally centrally located, laterally extending projections 42. A pivot pin 44 pivotably couples the arms of each of the grippers. A spring 46 encompasses each pivot pin and contacts the adjacent handles to urge the handles apart and to thereby urge the fingers together for releasable coupling to a recipient surface 48 of a trailing vehicle. The recipient surface may be a transom of a towed boat as illustrated or a portion of a towed vehicle or the like. One of the handles of each of the grippers has a hole 50 with a second bolt 52 and an associated nut 54. Each of the arms is fabricated of a rigid material with an elastomeric sleeve 56 over each of the fingers and handles. The preferred material for the arms is a composite plastic. Other rigid materials including other composites, plastics, and metallic materials could also be utilized.

A coupling assembly 60 is next provided. The coupling assembly adjustably couples each of the housings to one of the associated handles. Each coupling assembly has a primary component 62 and a secondary component 64. Each primary component has a first section 66 positioned in contact with one of the associated handles and a second section 68 extending forwardly at a right angle from the first section. The second bolt adjustably couples the first section to the handle. Each secondary component has a third section 70 positioned in contact with one of the associated second sections. Each secondary component has a fourth section 72 extending laterally at a right angle from the third section. The first bolt adjustably couples one of the associated housings to the fourth section. Each coupling assembly has a third bolt 74 with an associated nut 76 adjustably coupling the second and third sections. Each of the electric lights are adjustably coupled at spaced lateral locations to the recipient surface of the trailing vehicle. Each of the electric lights is individually adjustable in three orthogonal meridians by individual rotation about the first, second and third bolts. Each of the electric lights is also individually adjustable by repositioning the grippers with respect to the recipient surface.

Lastly, electric wires 80 are provided. The electric wires have fixed ends attached to the electric lights and free ends adapted to be operatively coupled to a towing vehicle 82.

Figure 4:
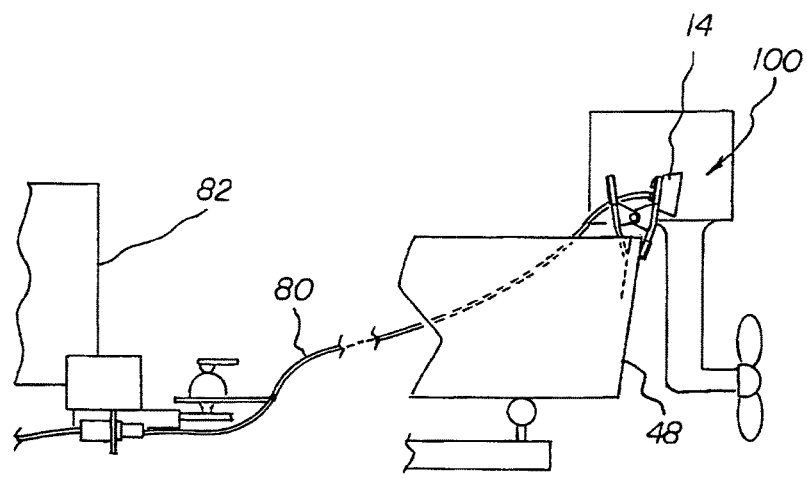
FIG. 4 is a side elevational view of the system taken along line 4-4 of FIG. 3.

An alternate embodiment of the invention is illustrated in FIGS. 3 through 6. In this embodiment, the coupling assembly 100 includes two vertically aligned, rearwardly extending bolts 104, two vertically aligned holes in one of the handling receiving the bolts, and an associated nut 106 on each bolt for securement purposes.

As to the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A trailer light system comprising:
    an electric light having a housing with generally horizontal exterior and interior surfaces and with a periphery, the exterior Surface having a translucent plate and with a light bulb within the housing;
    a gripper supporting the housing, the gripper being constructed of a pair of similarly configured arms, each arm having a downwardly extending finger and an upwardly extending handle, each arm having a laterally extending projection with a pivot pin pivotably coupling arms, a spring encompassing the pivot pin and contacting the handles; and
    a coupling assembly coupling the housing to the gripper, the gripper being removably supported on a recipient surface of a trailing vehicle, the electric light being adjustably positioned with respect to the recipient surface of the trailing vehicle, the coupling assembly including a first bolt extending downwardly from the periphery of the housing, the coupling assembly also including a primary component and a secondary component, the primary component having a first section positioned in contact with one of the handles, the primary component having a second section extending forwardly at a right angle from the first section, a second bolt adjustably coupling the first section to one of the handles, the secondary component having a third section positioned in contact with the second section, the secondary component having a fourth section extending laterally at a right angle from the third section, the first bolt adjustably coupling the housing to the fourth section, the coupling assembly also including a third bolt adjustably coupling the second and third sections.

2. A trailer light system for removably supporting and adjustably positioning a pair of similarly configured electric brake lights on a rear of a towed vehicle, the system comprising, in combination:
    a pair of similarly configured electric lights, each of the electric lights having a generally rectilinear housing, each housing having a generally horizontal exterior surface and a generally horizontal interior surface with a periphery between the exterior and interior surfaces, each exterior surface having a circular red translucent plate constituting the central extent of the exterior surface, a light bulb within each housing, a first bolt extending downwardly from the periphery with an associated nut;
    a pair of grippers, one gripper supporting said rectilinear housing, each of the grippers being constructed of a pair of similarly configured arms, each arm having a downwardly extending finger and an upwardly extending handle, each arm having generally centrally located, laterally extending projections with a pivot pin pivotably coupling the arms of each of the grippers, a spring encompassing each pivot pin and contacting the adjacent handles to urge the handles apart and to thereby urge the fingers together for releasable coupling to a recipient surface of a trailing vehicle, one of the handles of each of the grippers having a hole with a second bolt and associated nut, each of the arms being fabricated of a rigid material with an elastomeric sleeve over each of the fingers and handles;
    a coupling assembly adjustably coupling each of the housings to one of the associated handles, each coupling assembly having a primary component and a secondary component, each primary component having a first section positioned in contact with one of the associated handles and a second section extending forwardly at a right angle from the first section, the second bolt adjustably coupling the first section to the handle, each secondary component having a third section positioned in contact with one of the associated second sections and each secondary component having a fourth section extending laterally at a right angle from the third section, the first bolt adjustably coupling one of the associated housings to the fourth section, each coupling assembly having a third bolt with an associated nut adjustably coupling the second and third sections, each of the electric lights being adjustably coupled at spaced lateral locations to the recipient surface of the trailing vehicle, each of the electric lights being individually adjustable in three orthogonal meridians by individual rotation about the first, second and third bolts, each of the electric lights also being individually adjustable by repositioning the grippers with respect to the recipient surface; and
    electric wires having fixed ends attached to the electric lights and having free ends adapted to be operatively coupled to a towing vehicle.

* * * * *